(No Model.) 6 Sheets—Sheet 1.

T. HILL.
CYCLE.

No. 589,348. Patented Aug. 31, 1897.

Witnesses.
C. F. Kilgore
J. P. Merchant

Inventor.
Thomas Hill.
By his Attorney,
Jas. P. Williamson (No Model.) 6 Sheets—Sheet 2.

T. HILL.
CYCLE.

No. 589,348. Patented Aug. 31, 1897.

Witnesses.
C. F. Kilgore
J. D. Merchant

Inventor.
Thomas Hill.
By his Attorney.
Jas. F. Williamson (No Model.) 6 Sheets—Sheet 3.
T. HILL.
CYCLE.
No. 589,348. Patented Aug. 31, 1897.
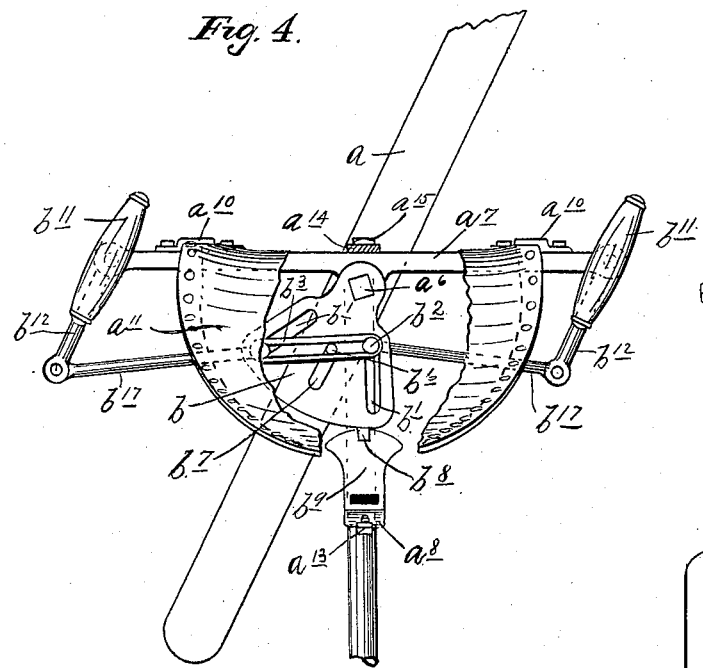
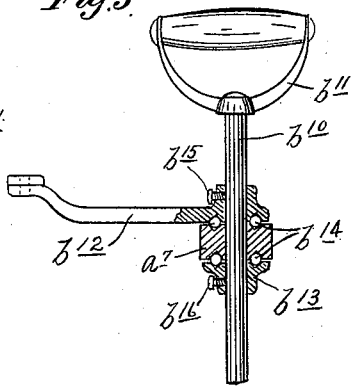
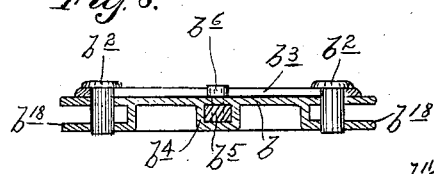
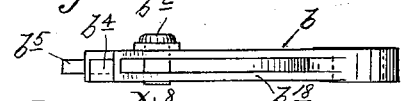
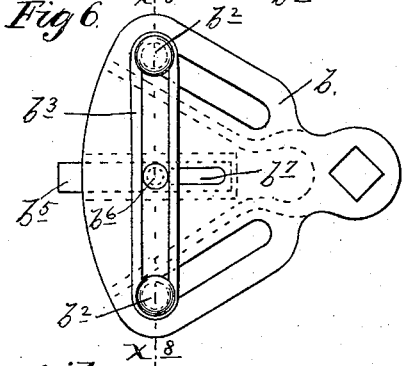
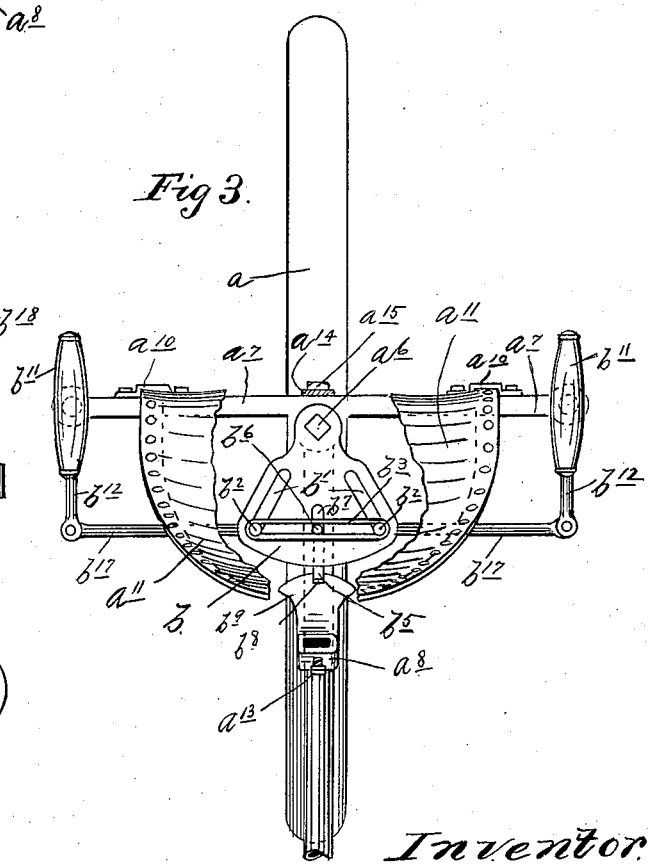
Witnesses.
C. F. Kilgore
K. D. Merchant
Inventor.
Thomas Hill,
By his Attorney
Jas. F. Williamson (No Model.) 6 Sheets—Sheet 4.
T. HILL.
CYCLE.
No. 589,348. Patented Aug. 31, 1897.
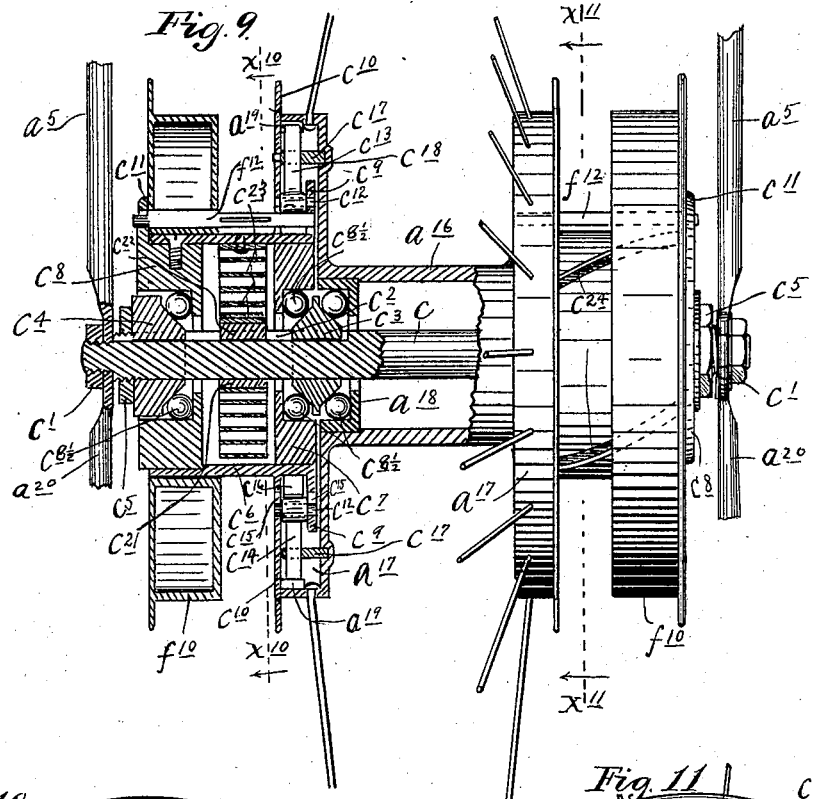
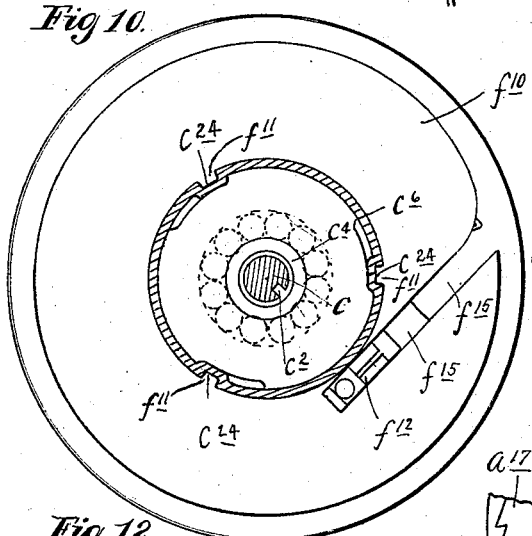
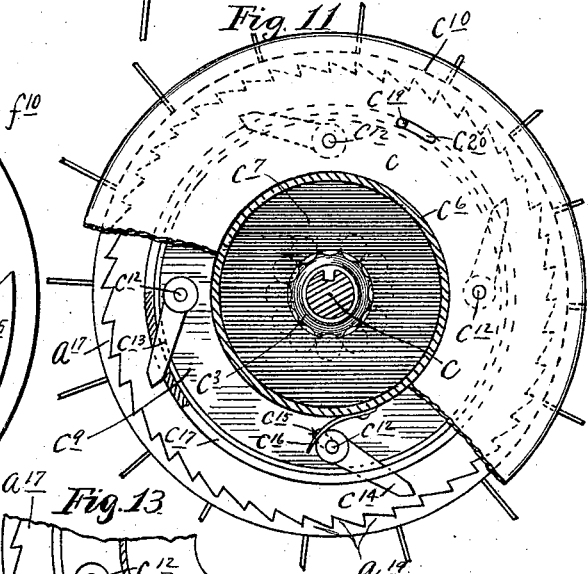
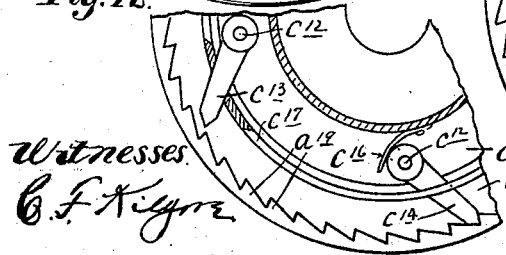
Witnesses
C. F. Kilgore
P. A. Merchant
Inventor
Thomas Hill
By his Attorney
Jas. P. Williamson (No Model.) 6 Sheets—Sheet 5.

T. HILL.
CYCLE.

No. 589,348. Patented Aug. 31, 1897.

Witnesses
C. F. Kilgore
P. D. Merchant

Inventor
Thomas Hill.
By his Attorney
Jas. F. Williamson (No Model.) 6 Sheets—Sheet 6.
T. HILL.
CYCLE.
No. 589,348. Patented Aug. 31, 1897.
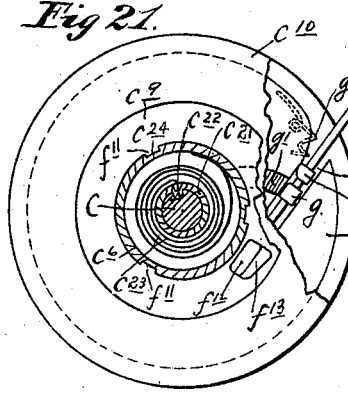
Fig. 21.
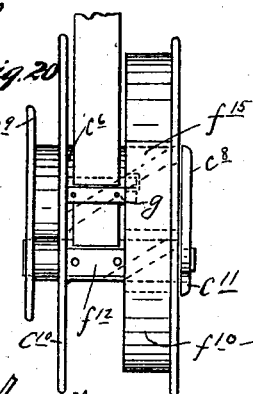
Fig. 20.
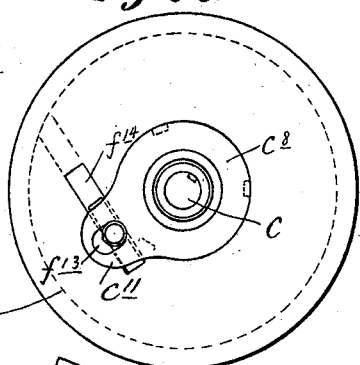
Fig. 22.
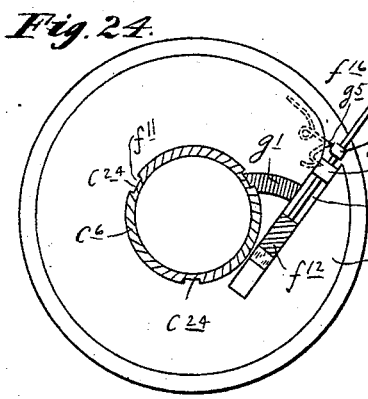
Fig. 24.
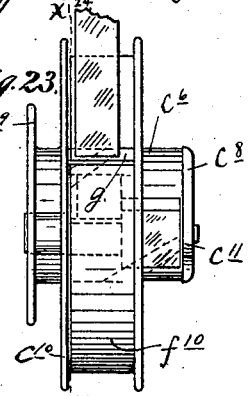
Fig. 23.
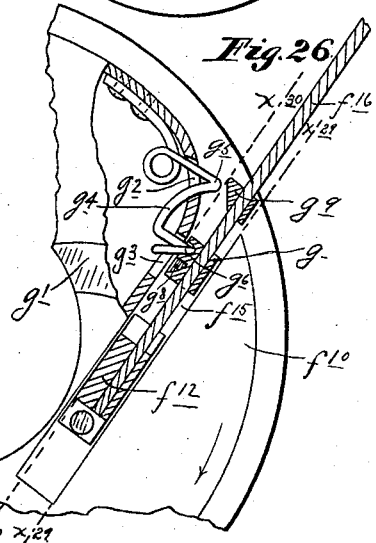
Fig. 26.
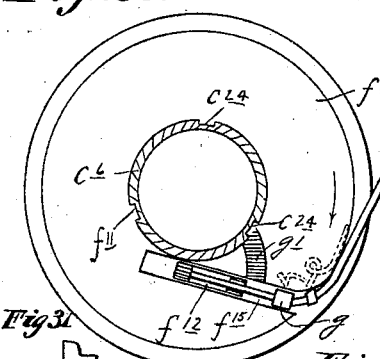
Fig. 25.
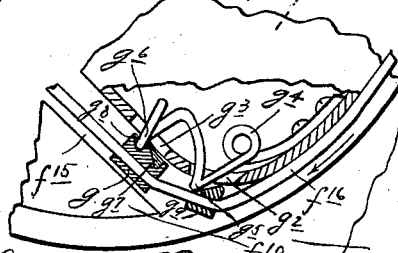
Fig. 27.
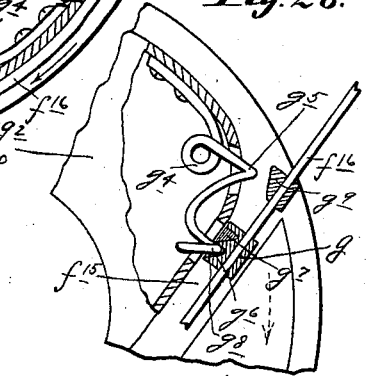
Fig. 28.
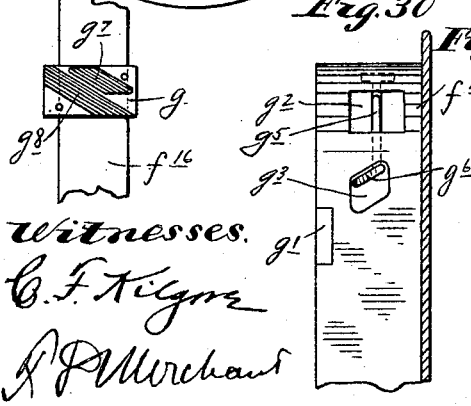
Fig. 31. Fig. 30. Fig. 29.
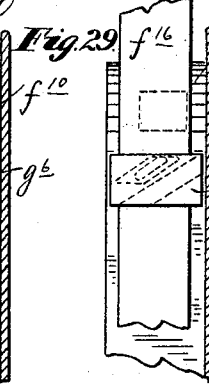
Witnesses.
C. F. Kilgore
A. P. Merchant
Inventor.
Thomas Hill.
By his Attorney.
Jas. F. Williamson

UNITED STATES PATENT OFFICE.

THOMAS HILL, OF RIVER FALLS, WISCONSIN.

CYCLE.

SPECIFICATION forming part of Letters Patent No. 589,348, dated August 31, 1897.

Application filed June 29, 1896. Serial No. 597,337. (No model.)

*To all whom it may concern:*

Be it known that I, THOMAS HILL, a citizen of the United States, residing at River Falls, in the county of Pierce and State of Wisconsin, have invented certain new and useful Improvements in Cycles; and I do hereby declare the following to be a full, clear, and exact description of the invention, such as will enable others skilled in the art to which it appertains to make and use the same.

My invention relates in general to cycles, but has for its especial object to generally improve that class of bicycles known as "safeties."

To these ends my invention comprises the novel devices and combinations of devices hereinafter described, and defined in the claims.

The preferred form of my invention is illustrated in the accompanying drawings, wherein, like letters referring to like parts throughout the several views—

Figure 1:
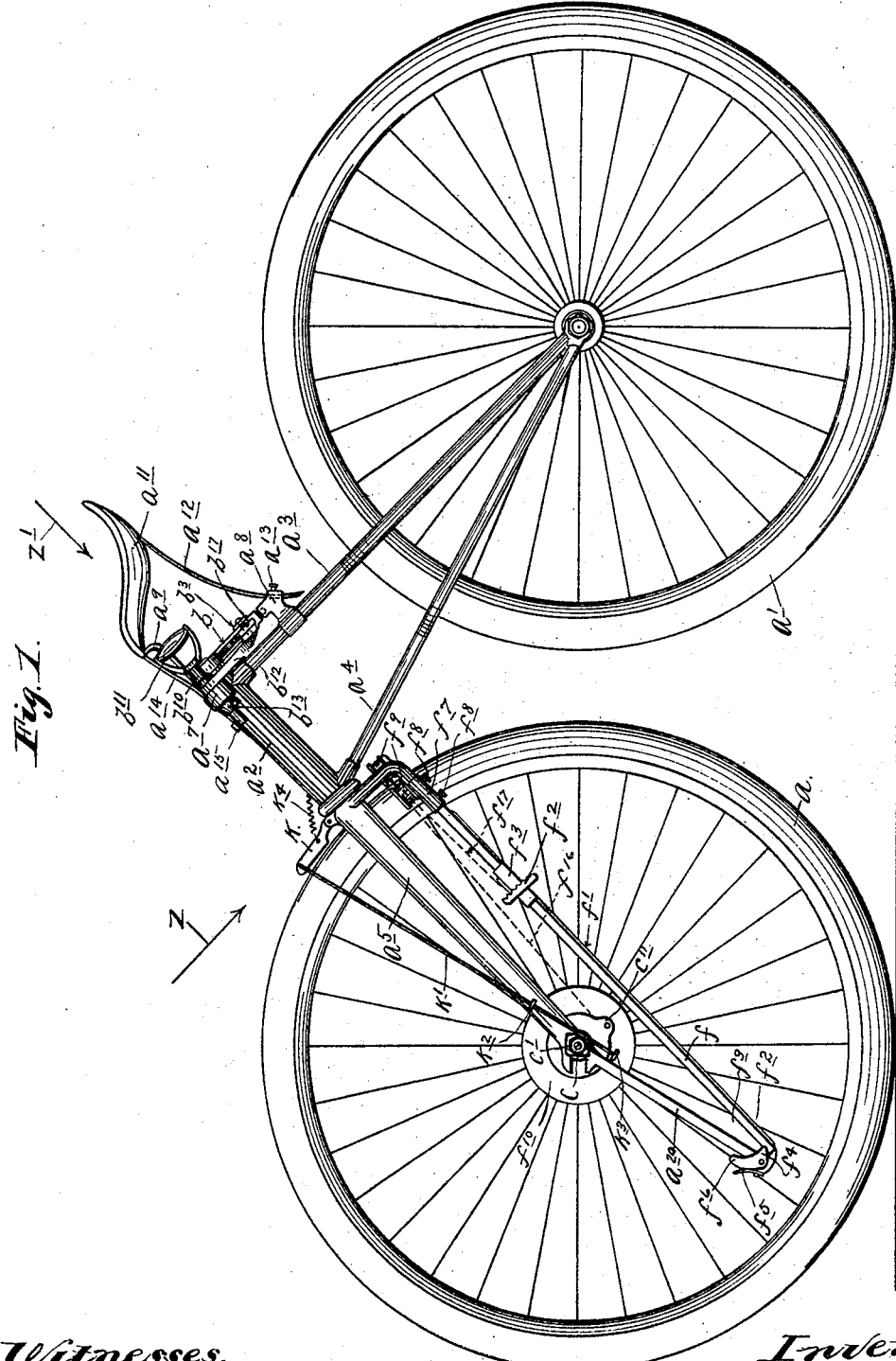
Figure 2:
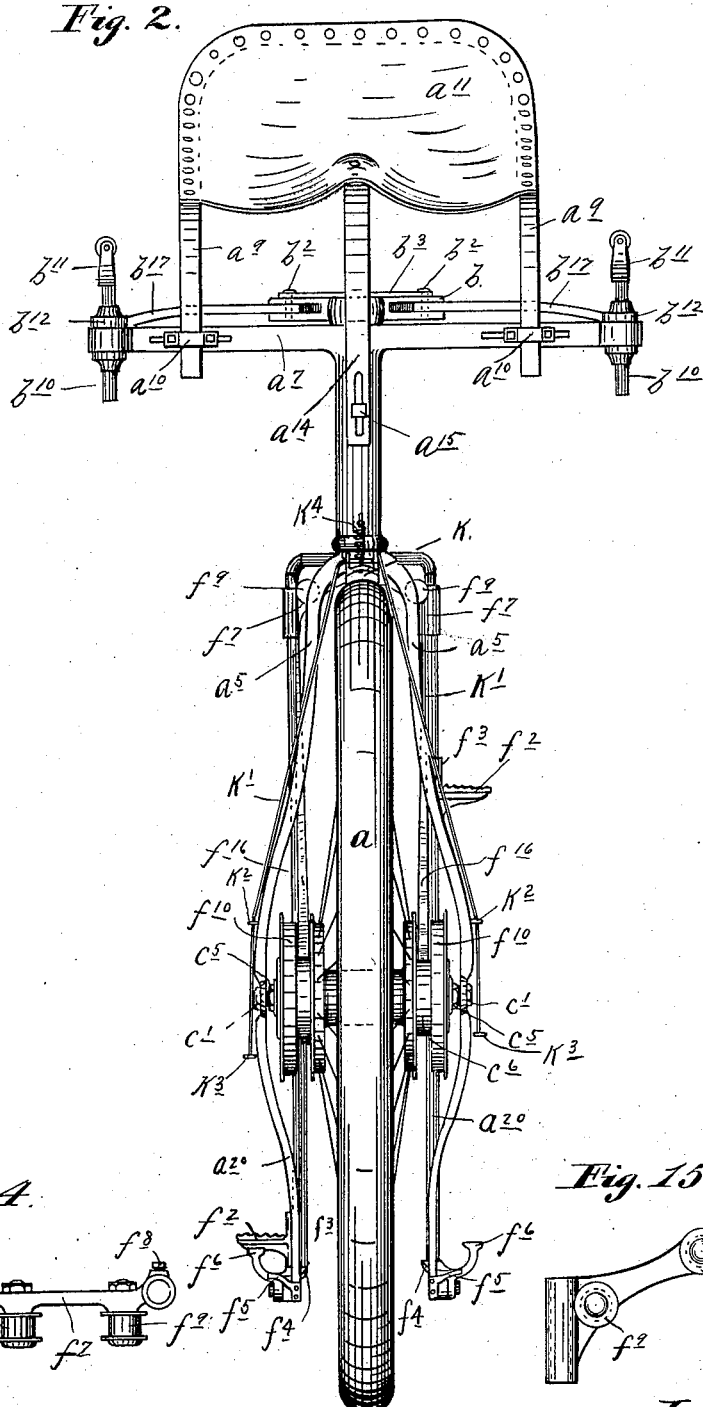
Figure 14:
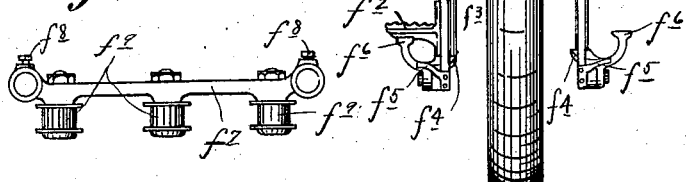
Figure 15:
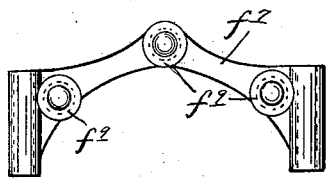
Figure 17:
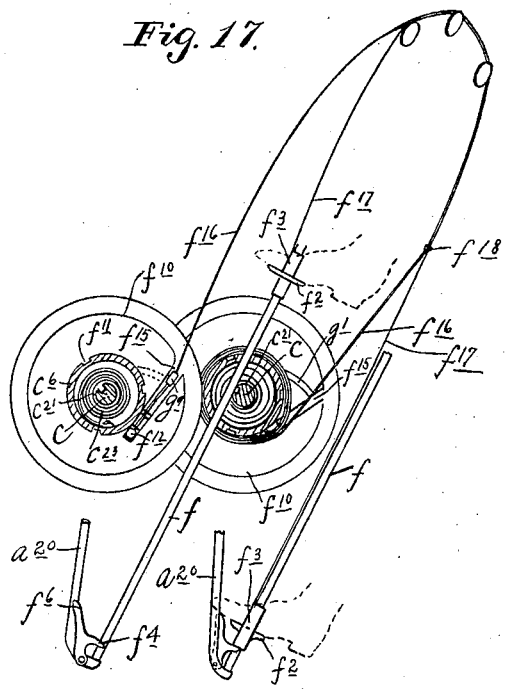
Figure 16:
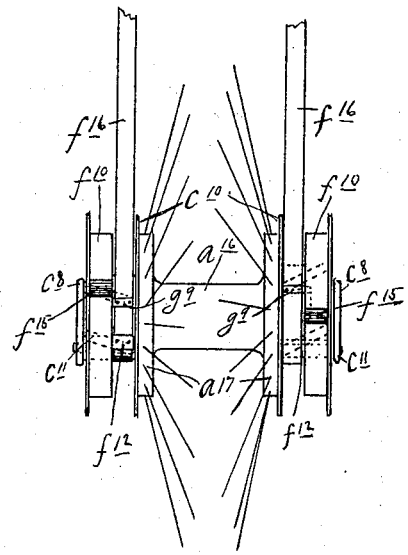
Figure 19:
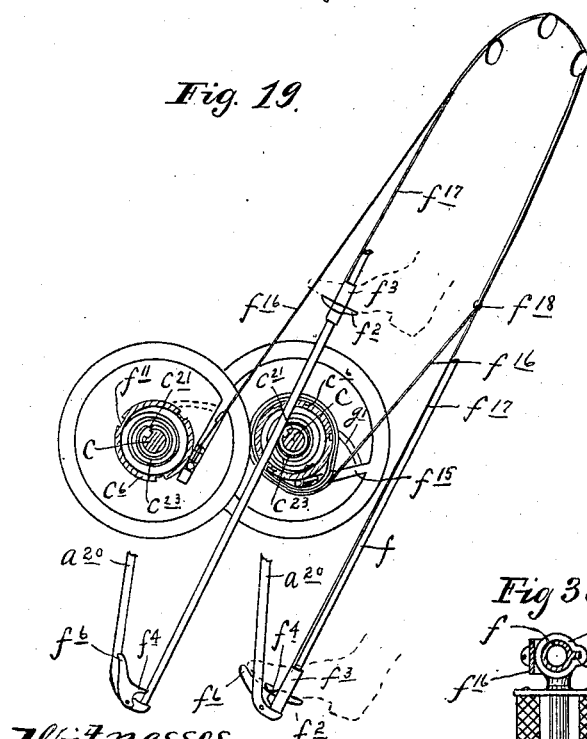
Figure 18:
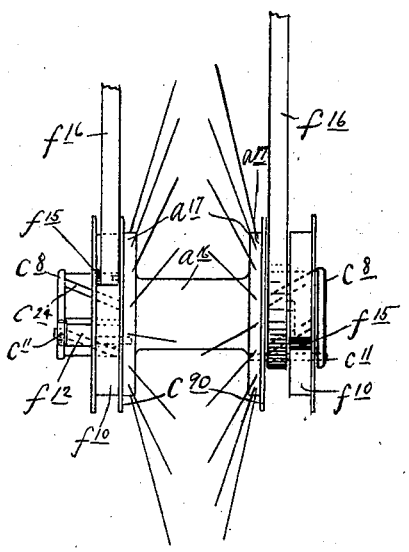
Figure 32:
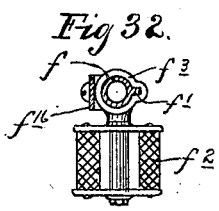

Figure 1 is a left side elevation showing a machine constructed in accordance with my invention. Fig. 2 is a front elevation looking at the machine substantially as indicated by the arrow $z$ on Fig. 1. Fig. 3 is a view in plan showing a portion of the rider's seat and the steering device for the front wheel, looking substantially as indicated by the arrow $z'$ on Fig. 1, some parts being broken away. Fig. 4 is a view of the parts shown in Fig. 3, looking as above indicated, but illustrating a turned position of the front wheel and steering devices, some parts also being broken away. Fig. 5 is a view, partly in side elevation and partly in section, of one of the steering-handles and immediately-connected parts. Fig. 6 is a plan view of the steering-head and immediately-connected parts. Fig. 7 is a side elevation of the parts shown in Fig. 6. Fig. 8 is a vertical section taken on the line $x^8\ x^8$ of Fig. 6. Fig. 9 is a view, partly in plan and partly in horizontal section, of the front-wheel hub, some parts being broken away. Fig. 10 is a vertical section taken on the line $x^{10}\ x^{10}$ of Fig. 9, looking in the direction indicated by the arrows. Fig. 11 is a vertical section taken on the line $x^{11}\ x^{11}$ of Fig. 1, looking as indicated by the arrows and showing one of the clutch devices, some parts of the same being broken away. Figs. 12 and 13 are views, partly in section, with some parts broken away, illustrating different positions of parts of the clutch shown in Fig. 11. Fig. 14 is a plan view showing in detail a roller-bracket and antifriction-rollers mounted thereon. Fig. 15 is a front elevation of the bracket and rollers shown in Fig. 14. Fig. 16 is a view in rear elevation showing a portion of the front wheel and the winding-drums coöperating therewith, the said parts being so adjusted that the flexible driving connections are working on the small members of said drums. Fig. 17 is a view in side elevation showing, diagrammatically, the parts indicated in Fig. 16. Fig. 18 is a view corresponding to Fig. 16, but showing one of the larger members of the winding-drums shifted so as to coöperate with the flexible driving connections. Fig. 19 is a view in side elevation showing, diagrammatically, the parts indicated in Fig. 18. Fig. 20 is a detail view, in rear elevation, of one of the double-faced winding-drums, the sections of the same being shown in their open or spread positions. Fig. 21 is a side elevation of the parts shown in Fig. 20, looking toward the right of the same, some parts being broken away. Fig. 22 is a side elevation of the parts shown in Fig. 20, looking toward the left of said figure. Fig. 23 is a view corresponding to Fig. 20, but showing the sections of the double-faced winding-drum closed or drawn together. Fig. 24 is a vertical section taken on the line $x^{24}\ x^{24}$ of Fig. 23, looking toward the right of said figure. Fig. 25 is a view corresponding to Fig. 24, but showing the flexible driving connections partially wound on the large section of the drum. Figs. 26, 27, and 28 are views, partly in section, with some parts broken away, showing a portion of the large section of the double-faced winding-drum. Fig. 29 is a section taken substantially on the line $x^{29}\ x^{29}$ of Fig. 26, looking as indicated by the arrow. Fig. 30 is a section taken substantially on the line $x^{30}\ x^{30}$ of Fig. 26, looking as indicated by the arrow. Fig. 31 is a detail view showing a portion of one of the flexible driving connections and a catch-block carried thereby. Fig. 32 is a plan view of one of the pedals, showing also a cross-section of the guide-rod on which the same is mounted to move.

Referring particularly to Figs. 1, 2, 3, and 4, $a$ indicates the forward wheel, and $a'$ the rear wheel, of my improved bicycle. The rigid section of the machine-frame shown comprises the ball-head or socket $a^2$ and the pair of pronged or forked braces $a^3$ and $a^4$, the stem ends of which are rigidly secured one to each end of the socket-section $a^2$ and the prongs of which are secured together on opposite sides of the wheel to form a suitable support for the rear-wheel axle. The frame thus formed is triangular in outline.

$a^5$ indicates the steering-fork, in the prongs of which the front-wheel axle is supported, as will later more fully appear, and the stem $a^6$ of which extends upward and is swiveled by means of the ordinary ball-bearings (not shown) in the socket-section $a^2$ of the rigid frame. The stem $a^6$ projects upward through said socket $a^2$ and has rigidly secured to its upper end a steering head or plate $b$.

To the upper end of the ball-head or socket $a^2$ of the rigid frame-section is rigidly secured a T-head or cross-arm $a^7$, and on the stem of the frame brace or section $a^3$ is rigidly secured a block $a^8$. The seat shown is formed by a U-shaped spring-metal strip $a^9$, the ends of which are rigidly but adjustably secured to the cross-bar $a^7$ by means of clamps $a^{10}$; a covering of leather or other flexible material $a^{11}$, secured to the bow portion of the yoke $a^9$; a rear support formed by a bar of spring metal $a^{12}$, the upper end of which is secured to the yoke $a^9$ and the lower end of which works through a suitable seat in the block $a^8$ and is adjustably held by means of a set-screw $a^{13}$, and a spring-strip $a^{14}$, secured at its upper end to the forward central portion of the covering $a^{11}$ and adjustably secured at its lower end to the frame-section $a^2$ by means of a slot and set-screw $a^{15}$. The seat thus constructed may be adjusted in all directions. For instance, it may be adjusted vertically both from the front and from the rear, so as to throw the seat at the desired angle to the pedals, as well as to move the seat the proper distance from the pedals. Again, by springing the prongs of the yoke or U-shaped piece $a^9$ toward or from each other the width of the seat may be varied to adapt the same to the rider, or in case the leather or flexible covering $a^{11}$ should stretch the seat may be spread to compensate for or take up the slack.

My improved steering device comprises as one of its elements a lock which normally holds the steering-wheel in line with or parallel to the other wheels of the machine, but which lock is automatically releasable by the steering movement of the steering device. Perfectly I accomplish these results as follows: It will be noted by reference particularly to Figs. 3 to 8, inclusive, that the head or plate $b$ on the upper end of the fork-stem $a^6$ has substantially the form of the segment of a circle. In this segmental head $b$ is formed a pair of cam-slots $b'$, which diverge from each other as they extend from the center of the stem $a^6$. In these slots $b'$ are loose pins $b^2$, which are connected on the upper face of the plate $b$ by means of a slotted bar or link $b^3$.

Working in a suitable seat $b^4$ in the steering head or plate $b$ is a sliding lock-plunger $b^5$, which is provided with a pin $b^6$, which works upward through a slot $b^7$ in the plate $b$ and extends into the slot of the link $b^3$. The rear end of this lock-plunger $b^5$ projects from its seat and normally engages with a notch $b^8$, formed in a flange $b^9$ of the block $a^8$ on the stem of the frame-brace $a^3$. When the lock-plunger $b^5$ is in engagement with the notch $b^8$ of said flange $b^9$, the front or steering wheel $a$ will be held in line with the rear wheel $a'$, which will, of course, cause the machine to move on a straight line.

In the extreme ends of the cross bar or head $a^7$ are mounted the stems $b^{10}$ of hand-pieces $b^{11}$. To the stems $b^{10}$, just above the ends of the cross-head $a^7$, are secured rearwardly-projecting arms $b^{12}$, and to the said stems, just below said cross-head $a^7$, are secured flanged collars $b^{13}$. The ends of the said cross-head, as well as the under surfaces of the arms $b^{12}$ and the upper surfaces of the collars $b^{13}$, are provided with suitable ball-grooves, in which are mounted loose bearing-balls $b^{14}$. The hubs of the arms $b^{12}$ are provided with set-screws $b^{15}$, and the hubs of the collars $b^{13}$ are likewise provided with set-screws $b^{16}$, both of which set-screws work through said hubs and are adapted to impinge or bite onto the stems $b^{10}$ of the hand-pieces $b^{11}$. By means of these set-screws $b^{15}$ and $b^{16}$ the handpieces $b^{11}$, with their stems $b^{10}$, may be given the proper vertical adjustment necessary to throw the said handles into the proper positions to adapt the same to the length of the rider's arms.

The rear ends of the arms $b^{12}$ are connected one to each of the loose pins $b^2$, which work in the slots $b'$, by means of links $b^{17}$. It will be noted that the inner ends of these links $b^{17}$, which engage the pins $b^2$, work in seats formed by a double-flanged portion $b^{18}$ of the steering head or plate $b$.

The operation of this steering device is substantially as follows: Assume that the parts are locked, as shown in Fig. 3, and that the machine is running straight. To cause the machine to turn to the right, it is only necessary to twist one or both of the handpieces $b^{11}$ on their stems $b^{10}$, as shown in Fig. 4. Under this change of position of the parts the initial movement of the right-hand member of the links $b^{17}$ toward the left first forces the right-hand pin $b^2$ forward in the slot $b'$, thereby withdrawing the lock-plunger $b^5$ from the notch $b^8$ of the flange $b^9$, and then the continued movement of the same causes the steering head or plate $b$ to move toward the left and, with a lever action, to turn the stem $a^6$, front fork $a^5$, and wheel $a$, as indicated in Fig. 4. Obviously a reverse movement of the left member of the steering-handles and connected parts from the position shown in Fig. 3 would likewise first retract the lock-plunger $b^5$ from the notch $b^8$, and then would cause the steering-head $b$ to move toward the right, which, carrying with it the stem $a^6$, fork $a^5$, and wheel $a$, would cause the machine to turn toward the left.

It will be noted that the forward edge of the flange $b^9$ is cam-shaped, so that as the projecting end of the lock-plunger $b^5$ is returned toward the notch $b^8$ said plunger will be forced into its seat thereby, thus permitting the return of the steering-head $b$ and parts carried thereby to their normal positions, in which positions, of course, the said lock-plunger is free to engage said notch $b^8$.

From the above it will be seen that by operating the proper handpiece $b^{11}$ alone or by moving both of the said handpieces in the same direction at the same time the lock $b^5$ will be thrown into its unlocking position, and there held while the steering-head $b$ is vibrated to and fro in the steering action. If, however, it is desired to again lock the wheel in its straight-line position, this may be done by moving the handle-pieces and connected parts into their normal or central positions, and then moving the said handpieces simultaneously in opposite directions, so that the connecting-rods $b^{17}$ and pins $b^2$ will be drawn apart. By this action, as must be evident, the pins $b^2$, working in the cam-slots $b'$, will carry the link $b^3$, together with the lock-plunger $b^5$, rearward, so that said lock-plunger will be engaged with the notch $b^8$.

The clutch mechanisms which operate on the forward or steering wheel $a$ will next be described. The hub $a^{16}$ of the forward wheel $a$ is provided with a pair of outwardly-facing annular flanges $a^{17}$, to which the spokes of the wheel are secured, and also with a pair of fixed annular ball bearings or runways $a^{18}$.

$c$ indicates the spindle around which and on which the hub $a^{16}$ of the wheel $a$, as well as certain other parts to be hereinafter mentioned, are mounted to rotate. This shaft $c$ is reduced at its ends to form a shoulder, against which the prongs of the front fork $a^5$ are clamped by means of nuts $c'$, working on the ends of said spindle $c$. The spindle $c$ is also provided at each end, commencing at the shoulder formed at its reduced ends, with long grooves or keyways $c^2$. On each end of the spindle $c$ is mounted a double-faced cone-bearing $c^3$ and a single-faced cone-bearing $c^4$, both of which are provided with suitable tongue or key portions, which work in or engage the coöperating grooves $c^2$. The said cone-bearings $c^3$ and $c^4$ are thus held against rotary motion but free for movement longitudinally on the said spindle. The cone-bearings $c^4$ may be forced inward on the spindle $c$ by means of follower-nuts $c^5$, which have screw-threaded engagement with said spindle. The flanges $a^{17}$ of the wheel-hub $a^{16}$ are provided with internal ratchet-teeth $a^{19}$.

$c^6$ indicates large cylindrical hub-sections working one on each side of the wheel-hub and provided each with a pair of rigidly-secured ball-seat sections or runways $c^7$ and $c^8$, secured in the interior of the same. When mounted for work, bearing-balls $c^{8\frac{1}{2}}$ work in series, respectively, between the inner faces of the double cone-bearings $c^3$ and the coöperating seat-section $a^{18}$, between the outer faces of said double cone-bearings $c^3$ and the coöperating ball-bearing sections $c^7$, and between the cone-faces of the cone-bearings $c^4$ and the ball-bearing sections $c^8$.

It is important here to note that the double-faced cone-bearings $c^3$ are loose for movement longitudinally on the spindle $c$. In virtue of this fact by simply tightening on the follower-nut $c^5$ and thereby forcing the cone-bearing $c^4$ inward the said double-faced cone-bearing $c^3$ will be caused to assume its proper position on the spindle, so that all of the bearing-balls on a given side of the hub will be pressed with equal tension by the bearing-surfaces with which they engage.

Each of the cylindrical hubs $c^6$ is provided at its inner end with a collar or annular flange $c^9$ and with another and larger flange $c^{10}$, located a little distance inward from the collar or flange $c^9$. Each of the ball-bearing sections $c^8$ is also provided with a radially-projecting lug or ear $c^{11}$.

Other portions of the clutch mechanisms which coöperate with each of the ends and flanges $a^{17}$ of the wheel-hub $a^{16}$ will now be described in the singular. Mounted by means of pivot-pins $c^{12}$ between the flanges $c^9$ and $c^{10}$ of the hub $c^6$ are a series (as shown four) of driving-pawls $c^{13} c^{14}$. Of these pawls the ones marked $c^{13}$ are mounted on pivot-pins $c^{12}$, which are fixed against lateral movement, while the pin $c^{12}$ of the pawl $c^{14}$ is mounted in slots $c^{15}$, cut in the flanges $c^9 c^{10}$. These slots $c^{15}$ allow the pawl $c^{14}$ to be thrown ahead and outward in advance of an angle drawn at ninety degrees to the adjacent rearward pawl $c^{13}$, and this pawl $c^{14}$ may therefore, for the sake of clearness, be termed a "leader." The pawl $c^{14}$ is held outward to the limit of said slots $c^{15}$ by means of a light leaf-spring $c^{16}$, secured at one end to the hub $c^6$ and bearing against the hub of said pawl with its other end.

$c^{17}$ indicates a loose ring of larger diameter than the flange $c^9$, but of less diameter than the flange $c^{10}$, the inner edge of which works with a light friction in an annular grooved seat $c^{18}$, formed in the radially-flanged portion of the wheel-hub $a^{16}$. The outer edge of this ring $c^{17}$ is provided with a pin $c^{19}$, which works in a circular slot $c^{20}$, cut in the flange $c^{10}$. This ring $c^{17}$ is provided with suitable seats or peripheral passages, through which the free ends of the pawls $c^{13}$ and $c^{14}$ work to and fro. As this ring $c^{17}$ is to control the ratchet-engaging movements of the said pawls, it may be well termed the "pawl-ring."

On the spindle $c$, between the cone-bearings $c^3$ and $c^4$, is a collar $c^{21}$, which is provided with a key $c^{22}$, which also engages in the keyway $c^2$. By this key $c^{22}$ the collar, while free for sliding movement on said spindle, is held from rotary movement. To this collar $c^{21}$ is rigidly secured one end of a spiral spring $c^{23}$, the other end of which spring is rigidly secured to the interior of the cylindrical hub $c^6$. The spring $c^{23}$ is wound in such a direction that it tends to turn the hub $c^6$ in a direction opposite to that in which the wheel $a$ is moved under the advanced movement of the machine.

The propelling mechanism for imparting motion to the machine will now be described.

Both of the prongs of the front fork $a^5$ are provided with extensions or arms $a^{20}$, to the lower ends of which are rigidly secured the lower ends of pedal-guide rods $f$. These pedal-guide rods $f$ extend one on each side of the wheel $a$, substantially parallel to the stem of the front fork, and the extreme upper ends of the same are bent inward and forward and rigidly united to the upper portions of the front fork $a^5$. The pedal-guide rods $f$ are provided with continuous longitudinal flanges or ribs $f'$, which serve to strengthen and stiffen the said guide-rods, as well as to prevent the pedals from turning on the same.

$f^2$ indicate the pedals, which are provided with sleeve portions $f^3$, which fit and work longitudinally on the guide-rods $f$ and are prevented from turning by means of the flanges $f'$. The extreme downward movement of the pedals $f^2$ is limited by means of stops $f^4$, which are pivoted one to each of the extended supports $a^{20}$ in such position that they normally intercept the movement of the pedal-sleeves $f^3$. These pivoted stops $f^4$ are spring-held in their normal positions by means of springs $f^5$ and are provided with projecting free ends $f^6$, with which the rider's foot, by a peculiar movement hereinafter described, may be engaged.

On the pedal-guide rods $f$, above the pedals $f^2 f^3$ and near the extreme upper ends of said rods $f$, is adjustably secured a roller-bracket $f^7$, which is adjustably secured on said rods $f$ by means of set-screws $f^8$. On this roller-bracket $f^7$ are loosely mounted three antifriction-sheaves $f^9$.

The loose cylindrical hubs $c^6$ are each provided with peripheral cam-grooves $c^{24}$, which are formed on the line of a spiral or screw. On each of these hubs $c^6$ is loosely mounted a large drum $f^{10}$, which is provided with feathers or tongues $f^{11}$, which work one in each of the spiral cam-grooves $c^{24}$. It will be noted by reference particularly to Figs. 9 and 20 that the large drum $f^{10}$ is about one-half the width of that portion of the hub $c^6$ which projects outward beyond the flange or pawl-disk $c^{10}$.

In connection with each of the clutch mechanisms and drums are the following devices: $f^{12}$ indicates an anchor-bar, the ends of which are mounted in suitable seats $f^{13}$, formed in the lugs $c^{11}$ and flanges $c^9 c^{10}$ of the loose hub $c^6$. It will be noted by reference particularly to Figs. 21 and 22 that these seat portions $f^{13}$ are of such radial dimensions that the said anchor-bar may move a slight distance radially therein. The body of this anchor-bar $f^{12}$ works through a tangential slot or seat $f^{14}$, formed in the large drum $f^{10}$. This slot or seat $f^{14}$ is of sufficient length to permit a considerable movement of the anchor-bar $f^{12}$ therein and extends outward to the periphery of said drum to form a channel $f^{15}$, which is open on its inner side, but closed on its outer side, as shown in Figs. 9, 10, and 21 to 28. Normally the large drum $f^{10}$ stands as shown in Fig. 9, and the periphery of the hub $c^6$ between said drum $f^{10}$ and the pawl-disk $c^{10}$ serves as the smaller of the two winding or drum sections upon which the flexible driving strap or connection is wound.

The two anchor-bars $f^{12}$ on the opposite sides of the wheel-hub are connected by a suitable flexible driving connection, which, as shown, is in the form of a flat strap $f^{16}$, arranged to run over the three guide-sheaves $f^9$ on the bracket $f^7$. This flexible connection $f^{16}$ is of such length that when it is moved in one direction it will permit the reverse movements of the hubs or cylindrical section $c^6$, thus causing one of the spiral springs $c^{23}$ to be wound up while permitting the other to unwind. In the normal positions of the winding-drum sections, as shown in Fig. 9, the ends of the flexible connection $f^{16}$ work on the small drum-sections formed by the hubs $c^6$.

The hubs $f^3$ of the opposite pedals $f^2$ are connected by means of a flexible connection or strap $f^{17}$, which also runs over the three guide-sheaves $f^9$ on the bracket $f^7$. The two flexible connections $f^{16}$ and $f^{17}$ are yoked or otherwise rigidly secured together near their central portions, as shown at $f^{18}$. (See particularly Figs. 17 and 19.) The relations of the straps $f^{16}$ and $f^{17}$, pedals $f^2$, winding-drums $c^6 f^{10}$, and springs $c^{23}$ are such that when, for example, the right foot is forced downward to its normal limit the left pedal and foot will be forced upward, the right-side end of the connection $f^{16}$ will be wound on the coöperating drum-section under the action of the right spring $c^{23}$, while the left-side end of said connection $f^{16}$ will be unwound from the coöperating drum-section against the action of the left-hand spring $c^{23}$.

Returning now to the operation of the clutch mechanisms under the pending action, it will be noted that the downstroke of the right pedal, for example, throws the left-side clutch device into action on the forward wheel. The action of this clutch mechanism noted in detail is substantially as follows: The down movement of the right foot will, as before stated, carry the loose sleeve or hub $c^6$, together with the parts carried thereby, forward in the direction of the travel of the wheel $a$, but at a more rapid rate of speed. Now, as the pawl-ring $c^{17}$ has a greater friction against the radial flange of the wheel-hub $a^{16}$ than it has against the pawl-disk $c^{10}$, it will be retarded in its forward movement with respect to the hub $c^6$ and pawl-disk $c^{10}$, and hence will simultaneously throw the guiding-pawls $c^{13}$ and $c^{14}$ outward toward the ratchet-teeth $a^{19}$ of the hub-flange $a^{17}$; but the leader-pawl $c^{14}$, being forced to the outward limit of the slot $c^{15}$ by the action of the spring $c^{16}$, will be the first to engage with the said ratchet-teeth $a^{19}$. This leader-pawl $c^{14}$, having been engaged with the teeth $a^{19}$, will be driven backward to the limit of the slots $c^{15}$, at the limit of which movement the other three pawls $c^{13}$ will be forced to the bottom of the ratchet-teeth $a^{19}$. This leader-pawl, moving as it does into engagement with the teeth $a^{19}$ in advance of the pawl $c^{13}$, serves to throw the said ratchet-teeth $a^{19}$ into such relation with respect to the pawls $c^{13}$ that when the said pawls $c^{13}$ are subsequently thrown into engagement therewith they will be moved directly to the bottom of the engaged teeth. This action prevents the ends of the pawls $c^{13}$ from catching on the points of the ratchet-teeth.

The slipping movement of the pawl-ring $c^{17}$ is limited by the engagement of the pin $c^{19}$ in the slot $c^{20}$ of the pawl-disk $c^{10}$. As the right foot is raised and the left foot lowered this left member of the hub-sections $c^6$ will under the action of its spring $c^{23}$ be moved in a reverse direction from the movement of the forward wheel $a$. Under this action the pawl-ring $c^{17}$ will by its frictional engagement with the vertical flange or seat portion $c^{18}$ of the hub $a^{16}$ be moved forward with respect to the hub $c^6$ and pawl-disk $c^{10}$ as far as permitted by the slots $c^{20}$ and pin $c^{19}$. This movement of the pawl-ring serves to retract or withdraw the driving-pawls $c^{12}$ and $c^{13}$ from engagement with the ratchet-teeth $a^{19}$. It will thus be seen that the pawl-and-ratchet device is rendered silent in its action by means of the slipping pawl-ring $c^{17}$. It will of course be understood that under the pedaling action the clutch devices are alternately rendered active on the wheel-hub $a^{16}$ and that either one or the other will always be active thereon.

Under the action above described the flexible connection $f^{16}$ is wound onto and unwound from the hubs $c^{16}$, which serve as the small members of the winding-drums.

Directing attention now particularly to Figs. 9, 18, and 19 it will become apparent that if one of the large winding-drums $f^{10}$ is caused to turn backward on the hub $c^6$ against the direction of the wheel's travel or if the said drum $f^{10}$ is held from rotation while the hub $c^6$ is permitted to rotate forward with the front wheel the said drum $f^{10}$ will, by the action of the spiral groove-and-feather connections $c^{24} f^{11}$, be caused to move from the positions shown in Figs. 16 and 20 into the positions shown by one of the hubs of Fig. 18 and in Fig. 23. In this position the flexible connection $f^{16}$ will be wound on the said large drum-section $f^{10}$. This sliding or shifting movement of the large drum-sections $f^{10}$ is in practice accomplished as follows: On each end of the flexible connection $f^{16}$ a short distance from the anchor-bars $f^{12}$ are rigidly secured stop-lugs $g$, the outer ends of which normally work in grooves $g'$, cut in the inner faces of the large drums $f^{10}$ and running on a curve from the channel $f^{15}$ inward toward the center of said drum. The projecting end of this stop-lug $g$ is by an excessive downward movement of one of the pedals adapted to be thrown against the outer face of the channel $f^{15}$ to intercept or stop the rotary movement of the particular drum $f^{10}$, as will presently appear. The inner wall of the channel $f^{15}$ of each wheel $f^{10}$ is formed with a pair of openings $g^2$ and $g^3$.

$g^4$ indicates a retaining-spring, the inner end of which is rigidly secured to the drum $f^{10}$, and the free end of which is bent to form two projecting beaks or points $g^5 g^6$, which work, respectively, outward through the passages $g^2$ and $g^3$. The inner face of the stop-block $g$ is provided with a detent notch or depression $g^7$ and with a slot $g^8$, the ends of which are left open. The beak $g^6$ is adapted for engagement with these depressions $g^7$ and $g^8$ in a manner and for a purpose which will presently appear. The ends of the flexible connections $f^{16}$ are also provided, just outward of the stop-lugs $g$, with cam-lugs $g^9$, which are adapted to engage the beak portions $g^5$ of the springs $g^4$ and to engage into the passages $g^2$ of the inner walls of the channels $f^{15}$ in a manner which will also presently appear.

Attention is here called to the fact that by the extreme normal downward movement of one of the pedals—for example, the right member—against the pivoted stop $f^4$ the left side end of the flexible connection $f^{16}$ is thrown into the position indicated in Figs. 17 and 21, by reference to which it will be seen that the said flexible connection is not thrown quite into straight line with the channel $f^{15}$ and that the stop-lug $g$ has not been moved into the channel $f^{15}$ or against the rear wall of the same. Hence the hub $c^6$ and the coöperating loose drum $f^{10}$ will have no other tendency than to rotate together, and the ends of the flexible connection will, under the pedaling action, continue to be wound onto and unwound from the section of said hub $c^6$, which serves as the smaller member of the winding-drums.

When it is desired to shift the large winding sections or drums $f^{10}$ so that the flexible connection $f^{16}$ will be wound onto and unwound therefrom, this may be accomplished very easily by the rider without dismounting or without slacking the propelling motion. To accomplish this, the rider, as he forces one foot—for example, the right foot—downward to the extreme limit of the pedal's normal movement at the same time presses his toe downward beyond a natural position, so as to strike the free end $f^6$ of the right-side stop $f^4$, thus removing said stop $f^4$ from the path of the pedal-sleeve $f^3$ and permitting the pedal $f^2$ to be thrown downward into the extreme position shown in Fig. 19. This extreme downward movement of the right pedal turned the left member of the hubs $f^6$ into an extreme forward or advanced position, as shown in Fig. 19; but it will be noted that by this extreme forward movement the stop-lug $g$ on the left end of the strap or connection $f^{16}$ was by the initial portion of this extreme movement thrown against the outer wall of the channel or groove $f^{15}$ in the drum $f^{10}$. This stop-finger $g$ thus became a stop and served to limit or intercept the farther forward movement of said drum $f^{10}$, but the hub $c^6$ was moved on forward after the drum $f^{10}$ was thus stopped. This movement of the hub $c^6$ in advance of the drum $f^{10}$ was of course produced against the tension of the coöperating spring $c^{23}$ and the cam action of the groove-and-feather connections $c^{24}$ and $f^{11}$ positively forced the left drum-section $f^{10}$ from the position shown in Figs. 9, 20, and 16 into the position shown in Figs. 18 and 23. By this movement it will be noted the channel or slot $f^{15}$ of the drum $f^{10}$ was moved over or caused to straddle the end of the flexible connection $f^{16}$, and hence the said connection will now be wound onto and unwound from these large drum-sections $f^{10}$.

It will be understood, of course, that to effect the shifting of both of the large drums $f^{10}$ the right-side member of the same must be shifted by an extreme downward-tripping movement of the left foot, which causes an operation similar to that just described.

The action of the springs $g^4$ $g^5$ $g^6$ should be here noted. Under the action just described it will be remembered that after the stop-lug $g$ intercepted the movement of the drum $f^{10}$ the collar $c^6$, together with the parts carried thereby, including, of course, the anchor-bar $f^{12}$, were given a slight rotary movement onward. This movement permitted the stop-lug $g$ to move outward in the channel $f^{15}$, so that the detent-notch $g^7$ thereof was engaged by the beak $g^6$ of the spring $g^4$. This engagement of the beak $g^6$ with the detent-notch $g^7$ serves to prevent the return movement of the strap $f^{16}$ and thereby holds the hub $c^6$ from return rotary movement with respect to the drum $f^{10}$ under the action of the spring $c^{23}$. Evidently the time at which this return movement of the hub $c^6$ with respect to the drum $f^{10}$ would tend to take place would be just as the strap $f^{16}$ is given its first slack or release by the upstroke of the foot on the opposite side of the machine and before the said strap has been wound onto the drum $f^{10}$; but, as just described, this is prevented by the engagement of the beak $g^6$ with the detent-notch $g^7$.

As the strap or connection $f^{16}$ is wound onto the drum $f^{10}$ the cam-lug $g^9$ is forced against the beak $g^5$ of the spring $g^4$ and then is inserted into the passage $g^2$. By this action the beak $g^6$ of the spring $g^4$ was forced out of the detent-notch $g^7$ and into the open-ended slot $g^8$ of the stop-lug $g$. It will be noted by reference to Fig. 31 that the slot $g^8$ is cut on an angle to the strap or connection $f^{16}$. The line of this slot indicates the direction of the movement of the stop-lug $g$ with respect to the spring-beak $g^6$ under the compound sidewise and rotary movement of the said parts with respect to each other caused by the spiral movement of the drum $f^{10}$ on the hub $c^6$. When the beak $g^6$ is engaged with the slot $g^8$, it no longer serves as a lock to prevent the return movement of the hub $c^6$ with respect to the drum $f^{10}$; but this return movement is now prevented by the friction of the strap $f^{16}$ on the drum $f^{10}$, and also by the engagement of the cam-lug $g^9$ with the passage or seat $g^2$.

To shift the drums $f^{10}$ back into their normal positions with respect to the hubs $f^6$, it is only necessary for the rider to again force one foot and then the other into extreme downward positions by tripping the pivoted stops $f^4$, as indicated in Fig. 19. This extreme downward movement of, for example, the right foot again throws the channel $f^{15}$ of the left-side drum $f^{10}$ into straight line with the strap $f^{16}$, as shown in Fig. 28. The spring-beak $g^6$ now being engaged with the open slot $g^8$ of the stop-lug $g$ will offer no resistance to the inward movement of said stop-lug, and hence upon the initial slack or release of the left end of the strap $f^{16}$, caused by the upward movement of the right foot, the spring $c^{23}$ is permitted to become active to throw the left-side hub $c^6$ in the direction indicated by the dotted arrow in Fig. 28; but as the stop-lug $g$ has been drawn outward in the channel $f^{15}$ beyond the slot $g'$ the drum $f^{10}$ will not be allowed to return with the sleeve $c^6$ until said lug has been drawn inward in line with said slot $g'$ by the spiral movement of said collars $c^6$ within said drum $f^{10}$, at which time the said drum $f^{10}$ will have been moved outward into its normal position. The return of the two large drums $f^{10}$ must, of course, be accomplished one after the other by the successive downward movement of the opposite pedals.

The brake device which I have shown comprises simply a friction blade or spoon $k$, pivoted at one end to the yoke of the front fork in position to engage the tire of the front wheel and connected at its free end to a pair of rods $k'$, extending on opposite sides of the wheel, working through suitable keeper-guides $k^2$ on the front-fork prongs, and terminating at their lower ends in laterally-projecting foot-pieces $k^3$. The brake-spoon $k$ is normally held out of engagement with the wheel by a coiled spring $k^4$. These foot-pieces $k^3$ stand in such positions that they will normally be cleared by the rider's feet. The rider may, however, by throwing his toes slightly inward engage either one or both of these foot-pieces $k^3$. Attention is also called to the fact that the brake foot-pieces $k^3$ are located at such heights that the pedals $f^2$ pass each other adjacent thereto. In virtue of this fact the rider may apply the brakes without removing his feet from the pedals. It must be obvious that this brake may be readily applied with any desired force from the lightest to an extremely powerful application of the brake.

In connection with the bracket $f^7$ and guide-sheaves $f^9$, carried thereby, it is important to note that as this bracket is adjustable longitudinally on the pedal guide-rods $f$ the said bracket and sheaves may be used as a belt-tightener, by means of which the slack of the flexible connection $f^{16}$ may be taken up.

A few general observations of certain of the advantages of my machine may be here made.

By reference particularly to Figs. 1, 17, and 19 it will be noted that the pedals $f^2$ are mounted for reciprocating motions on their guide-rods $f$, which extend at such a forward angle that while the rider's feet are permitted full strokes without interference from the ground yet that when his feet are removed from the pedals and allowed to hang straight downward they may touch the ground. This feature of construction makes the machine very easy to mount and dismount and greatly decreases the liability to accidents by being thrown from the machine. Again, it will be noted, by reference particularly to Fig. 1, that the seat, the handpieces $b^{11}$, pedals $f^2$, and guide-rods $f$ are so positioned and related to each other that in the propelling action the rider's hands, shoulders, and feet will be kept substantially always in a straight line to each other. This gives the rider the advantages of a straight-line pull with his back and arms straight, which of course enables him to use his strength to the greatest advantage. Again, as the pedals and pedal guide-rods are carried with the fork of the front or steering wheel $a$ the rider may, by forcing the pedals forward or rearward with his feet, control the steering movements of said wheel even without the assistance of the hand-operated steering devices. Of course for the best control of the wheel the hand-operated steering devices would be used; but even when these hand devices are used the steering action may also be more or less controlled by the rider's feet.

It will be understood, of course, that while I have in the above description of the preferred form of my invention described the same as applied to a bicycle and used various specific terms in describing the parts thereof, yet that I do not intend to limit myself either to this particular use or to these particular details of construction. On the contrary, it should be understood that various alterations in these details of construction may be made without departing from the spirit of my invention.

What I claim, and desire to secure by Letters Patent of the United States, is as follows:

1. A propelling mechanism comprising a pair of clutches, one section of each of which clutches is movable with the traction-wheel and the other section of which is loose, a pair of winding-drums carried by each of said loose clutch-sections, a pair of pedals, flexible connections connected to said pedals, and engageable, at will, with either member of the pair of winding-drums, substantially as described.

2. A propelling mechanism comprising a pair of clutches, one section of each of which is movable with the traction-wheel and the other section of which is loose, a pair of winding-drums carried by each of said loose clutch-sections, a pair of pedals, a pair of flexible connections connecting said pedals, and a shifting device which is tripped by the extreme downward movement of the rider's foot and is operative to shift said flexible connection from one to the other of the sections of said winding-drums, substantially as described.

3. A propelling mechanism comprising a pair of clutches, one section of each of which clutches is movable with the traction-wheel and the other section of which is loose, small drum-sections rigidly secured to said loose clutch-sections, large drum-sections mounted for spiral movement on said small drum-section and provided with face-channels, a pair of pedals mounted for reciprocating motions, a pair of flexible connections secured together at their intermediate portions and connecting the pedals with each other and to the small members of said winding drum-sections, springs tending to move said small drum-sections against the advanced movement of the wheel, and a shifting device tripped by the extreme downward movement of the rider's foot and adapted to throw the drum-attached ends of said flexible connections into the face-channels of said large drum-sections, and thereby to shift the same, substantially as described.

4. A propelling mechanism comprising a pair of clutches, one section of each of which is movable with the traction-wheel and the other of which is loose, the hubs or drum-sections $c^6$ secured to the loose clutch-sections and provided with the lug portion $c^{11}$, the large drum-sections $f^{10}$ mounted for spiral movement on said small drum-sections $c^6$ and provided with the passages $f^{14}$ and face-channels $f^{15}$, the anchor-bar $f^{12}$ working through said passages $f^{14}$ and seated in the lug $c^{11}$ of said drum $c^6$, the pedal guide-rods $f$, the pedals $f^2$ movable on said guide-rods $f$, the pair of flexible connections $f^{16}$, $f^{17}$ connecting said pedals $f^2$ together and to said anchor-bars $f^{12}$, the pivoted trip-stops $f^4$ at the lower ends of the guide-rods $f$, and the stop-lugs $g$ on the ends of the flexible connection $f^{16}$ coöperating with the face-grooves $f^{15}$ to shift said drum $f^{10}$, substantially as described.

5. The propelling mechanism comprising a pair of clutches, one section of each of which is movable with the traction-wheel and the other of which is loose, the pair of hubs or drum-sections $c^6$ secured to the loose clutch-sections and provided with the lug portions $c^{11}$ and flanges $c^{10}$, the large drum-sections $f^{10}$ mounted for spiral movement on the drums $c^6$ and provided with the passages $f^{14}$ and face-channels $f^{15}$, the anchor-bars $f^{12}$ working through said passages $f^{14}$ and seated in said lugs $c^{11}$ and flanges $c^{10}$, the pedal guide-rods $f$, the pedals $f^2$ movable on said guide-rods $f$, the pair of flexible connections $f^{16}$, $f^{17}$ connecting said pedals together and to the anchor-bars $f^{12}$, the pivoted trip-stops $f^4$ at the lower ends of said rods $f$, the stop-lugs $g$ secured on the connection $f^{16}$ provided with detent-notches $g^7$ and slots $g^8$, the cam-lugs $g^9$ also secured on said connection $f^{16}$, and the springs $g^4$, $g^5$, $g^6$ carried by said drums $f^{10}$, working through passages $g^2$, $g^3$ thereof, and coöperating with the lugs $g$ and $g^4$, substantially as described.

6. In a cycle, the combination with a pair of independently-swiveled steering-handles, of a steering head or plate secured to the upper end of the pivoted fork-stem, a latch carried by said steering-head, operative to positively hold the steering-wheel in line with or parallel to the other wheel or wheels of the cycle, and connections from said handpieces to said steering-head and to said lock, so arranged as to move said steering-head or to operate said lock, at will, substantially as described.

7. In a cycle, the combination with the steering head or plate $b$ secured to the upper end of the pivoted fork-stem, and provided with the cam-slots $b'$ in which work loose pins $b^2$, of the reciprocating latch $b^5$ carried by said head $b$ and coöperating with the notched flange $b^8$, $b^9$ on the cycle-frame, the link $b^3$ engaging said pins $b^2$ and a projection $b^6$ of the lock $b^5$, the swiveled hand-bars $b^{10}$, $b^{11}$ provided with arms $b^{12}$, and the links $b^{17}$ connecting said arms $b^{12}$ to said pins $b^2$, substantially as described.

8. In a cycle, the combination with the steering head or plate $b$ secured to the upper end of the pivoted fork-stem and provided with the cam-slots $b'$ in which work loose pins $b^2$, of the reciprocating latch $b^5$ carried by said head $b$ and coöperating with the notched flange $b^8$, $b^9$ on the cycle-frame, the link $b^3$ engaging said pins $b^2$ and a projection $b^6$ of the lock $b^5$, the swiveled handle-bars $b^{10}$, $b^{11}$ mounted for vertical adjustments and provided with adjustable arms $b^{12}$, and the links $b^{17}$ connecting said arms $b^{12}$ to said pins $b^2$, substantially as described.

9. A clutch device, comprising two parts rotatable independently of each other, one having ratchet-teeth and the other carrying one or more pawls, and the pawl-ring $c^{17}$ provided with passages through which the free ends of said pawl or pawls pass, said ring having a limited rotary movement with respect to one section of said clutch, and having frictional engagement with the other section thereof, whereby said pawl or pawls are rendered silent in their action on said ratchet-teeth, substantially as described.

10. A clutch device, comprising two parts rotatable independently of each other, one having ratchet-teeth and the other carrying a series of pawls, one of which pawls is spring-held in advance of the others, and a pawl-ring with which said pawls engage, said ring having a limited rotary movement with respect to one of said clutch-sections and having frictional engagement with the other section thereof, substantially as described.

11. The combination with the wheel-hub provided with the internal ratchet-teeth, of the pair of loose hubs provided with a pawl disk or flange, the series of pawls mounted on said pawl-disk and engageable with said ratchet-teeth, one of which pawls is mounted for limited endwise movement and is spring-held in advance of the others, and the loose pawl-ring through which said pawls work, said pawl-ring being mounted for a limited rotary motion with respect to the pawl-disk and having frictional engagement with the flange of said wheel-hub, substantially as described.

12. The combination with the wheel-hub carrying the ball-seat $a^{18}$, of the spindle $c$ provided with keyways $c^2$, the loose hub $c^6$ provided with ball-seats $c^7$ and $c^8$, the double-faced cone-bearing $c^3$ and the single-faced cone-bearing $c^4$, both free for sliding movement but fixed from rotary movement on said spindle by means of key portions working in the grooves or keyways $c^2$, and bearing-balls working between said cone-bearings and the coöperating ball-seats, substantially as described.

13. The combination with the wheel-hub carrying the ball-seat $a^{18}$, of the spindle $c$ provided with keyways $c^2$, the loose hub $c^6$ provided with ball-seats $c^7$ and $c^8$, the double-faced cone-bearing $c^3$ and the single-faced cone-bearing $c^4$, both free for sliding movement but fixed from rotary movement on said spindle by means of key portions working in the grooves or keyways $c^2$, the follower or jam-nut $c^5$, screw-threaded on the end of said spindle and working against said cone-bearing $c^4$, and bearing-balls working between said cone-bearings and the coöperating ball-seats, substantially as described.

14. A seat, comprising the laterally-adjustable spring yoke-bar $a^9$, and the flexible covering $a^{11}$ stretched over the bow of the same and rigidly secured thereto, substantially as described.

15. A seat comprising the laterally-adjustable spring yoke-bar $a^9$, a flexible covering $a^{11}$ secured thereto, the spring front bar $a^{14}$ supporting the forward central portion of the covering $a^{11}$, and the rear spring-bar $a^{12}$ secured at its upper end to the bow of said bar $a^9$, substantially as described.

In testimony whereof I affix my signature in presence of two witnesses.

THOMAS HILL.

Witnesses:
HARRY KILGORE,
F. D. MERCHANT.